United States Patent

Morgan et al.

[11] 4,229,817
[45] Oct. 21, 1980

[54] PORTABLE ELECTRONIC CRYPTOGRAPHIC DEVICE

[75] Inventors: Barrie O. Morgan, Dallas; Merlon B. Carter, Richardson, both of Tex.

[73] Assignee: Datotek, Inc., Dallas, Tex.

[21] Appl. No.: 901,068

[22] Filed: Apr. 28, 1978

[51] Int. Cl.$^2$ .................... H04L 9/00; H04K 1/02
[52] U.S. Cl. ........................................ 375/2; 178/30
[58] Field of Search ................................. 178/22, 30

[56] References Cited

U.S. PATENT DOCUMENTS

| | | | |
|---|---|---|---|
| 3,740,745 | 6/1973 | Ehrat | 178/22 |
| 4,068,089 | 1/1978 | Kuhnlein et al. | 178/22 |
| 4,095,046 | 6/1978 | Frutiger et al. | 178/22 |
| 4,133,973 | 1/1979 | Branscome et al. | 178/22 |

*Primary Examiner*—Howard A. Birmiel
*Attorney, Agent, or Firm*—Richards, Harris & Medlock

[57] ABSTRACT

The specification discloses a portable cryptographic device, adapted to be hand-held through solid state electronics, which possesses the capability for enciphering and deciphering plain text. The housing of the device has a keyboard for the input of plain text or cipher text, including numeric characters and control signals and, further, has a display for displaying the inputs. Circuitry within the device is responsive to the inputs and controls the display. Additional circuitry enciphers or deciphers the inputs and substitutes the resulting text into the display.

The device incorporates a random code generator for generating a randomized message key which, together with the keyboard inputs, initiates and generates a long sequence of randomized letters for enciphering purposes. In a deciphering mode, a predetermined message key may be entered to set the random code generator at a point to generate the originally entered plain text. Also, a basic key composed of multiple segments fully initializes the random code generator such that more than one device could be used to encipher and decipher text. Similarly, by using different segments of the basic key, varying levels of security can be obtained.

Test circuitry is also provided to insure maintenance of the proper key variables and proper operation of the device.

35 Claims, 22 Drawing Figures

PORTABLE ELECTRONIC CRYPTOGRAPHIC DEVICE

FIELD OF THE INVENTION

This invention relates to cryptographic systems, and more particularly relates to portable cryptographic devices and methods capable of enciphering and deciphering more than one plain text character.

THE PRIOR ART

It has been previously known to use random digital code generators to generate long key streams of randomized digital bits for use in cryptographic systems. Prior techniques have included mechanical enciphering techniques, in addition to "table look-up" methods. In recent times, techniques have been developed for automatically electronically encoding and decoding digital text. An example of such automatic techniques is disclosed in U.S. Pat. No. 3,522,374, issued July 28, 1970.

In the cryptographic automatic techniques, one of the most important features is the length of the cycle of the random stream of key characters. Many prior systems have utilized the modulo-2 addition of clear text characters with the randomly generated key characters in order to provide a secure encipherment. As shown in U.S. Pat. No. 3,781,473, issued Dec. 25, 1973, and assigned to the present assignee, a random code generator providing an extremely long cycle length can be constructed from a plurality of autonomous sequential circuits which generate non-linear randomized digital signals. In these systems, nonlinear combining circuitry receives and nonlinearly combines the digital signals in order to generate a randomized digital key stream.

As shown in U.S. Pat. No. 3,781,472, issued Dec. 25, 1973, and assigned to the present assignee, prior electronic cryptographic systems have primarily been utilized with digital data transmission systems such as teleprinters and telex networks. Other systems have been used for voice scrambling, facsimile transmission and the like. Such prior cryptographic systems have been typically large and bulky and of necessity been required to normally remain stationary.

In today's mobile world, many instances arise wherein a secure message must be transmitted from a location remote from a stationary cryptographic system. Hence, a need has arisen for a portable cryptographic device which can be carried on the person and utilized at any time to encipher a message with a high degree of security for transmission by letter, over the telephone, by telegraph or otherwise.

A self contained data indicator unit is disclosed in U.S. Pat. No. 4,068,089 issued Jan. 10, 1978, but the unit is limited to enciphering only one character at a time and is therefore somewhat time consuming as well as not being completely satisfactory in ease of input and reading of the output. This prior unit also does not include any technique for diagnosing possible malfunctions in the unit which could affect the operation of the unit.

SUMMARY OF THE INVENTION

In accordance with the present invention, a cryptographic device is provided which is portable and which essentially reduces or eliminates many of the problems heretofore associated with previously developed cryptographic devices.

In accordance with the present invention, a cryptographic device is provided that is capable of receiving multiple inputs and enciphering or deciphering, as desired, the multiple input information. A keyboard is included for inputting said information, and a display displays the keyboard inputs. Circuitry is provided which is responsive to the keyboard inputs and controls the display. This circuitry also is capable of enciphering and deciphering the keyboard inputs and removing the already displayed keyboard inputs and displaying the enciphered and deciphered keyboard inputs. This device is self-contained to provide portability features and is miniaturized to a point of being capable of being hand-held. Circuitry is also provided to give alphanumeric capabilities and accordingly, the keyboard, when only constituting alphabetic letters, is provided with shift structure to provide numeric input capability. Circuitry also allows the operator to clear a data entry for new input and also to indicate an error when improper information has been input. Because of the individual and self-contained portable nature of the cryptographic unit, a time out feature is provided which serves to save power consumption.

In accordance with another aspect of the invention, a cryptographic device is provided which incorporates a random code generator and is capable of generating a randomized multi-letter message key. The random code generator is further responsive to the message key and keyboard inputs and generates a long sequence of randomized letters for enciphering purposes.

In accordance with another aspect of the present invention, a cryptographic device is provided with keyboard input capability and circuitry for receiving said keyboard inputs. Circuitry is also provided for receiving a predetermined message corresponding to an already randomly generated message key used in enciphering plain text. This circuitry sets the random code generator at a point to receive enciphered information and to generate the originally entered plain text.

In accordance with another aspect of the present invention, a cryptographic device is provided with circuitry capable of receiving a multi-input basic key to fully initialize a random code generator. In this manner, a second device may receive the same multi-input basic key to fully initialize its random code generator. The two or more devices are then synchronized and are capable of enciphering and deciphering information separately to generate logical plain text. Further, circuitry is provided that is responsive to different segments of the basic key input to provide different lengths of series of randomized digital key streams. In this manner, different levels of security are provided dependent on the different lengths of the digital streams.

In accordance with yet another aspect of the present invention, a cryptographic device is provided with circuitry capable of enciphering a plurality of keyboard inputs and storing the enciphered keyboard inputs. This circuitry further incorporates test circuitry for deciphering the stored enciphered inputs and generating the original logical input. In this manner, the circuitry provides a test comparison to the original input to insure proper operability of the cryptographic unit. Finally, this test circuitry also validates the correctness of the key variables which have been entered.

DESCRIPTION OF THE DRAWINGS

For a more complete understanding of the present invention and for further advantages and objects thereof, reference is now made to the following description taken in conjunction of the accompanying drawings, in which.

DESCRIPTION OF THE PREFERRED EMBODIMENT

Figure 1:
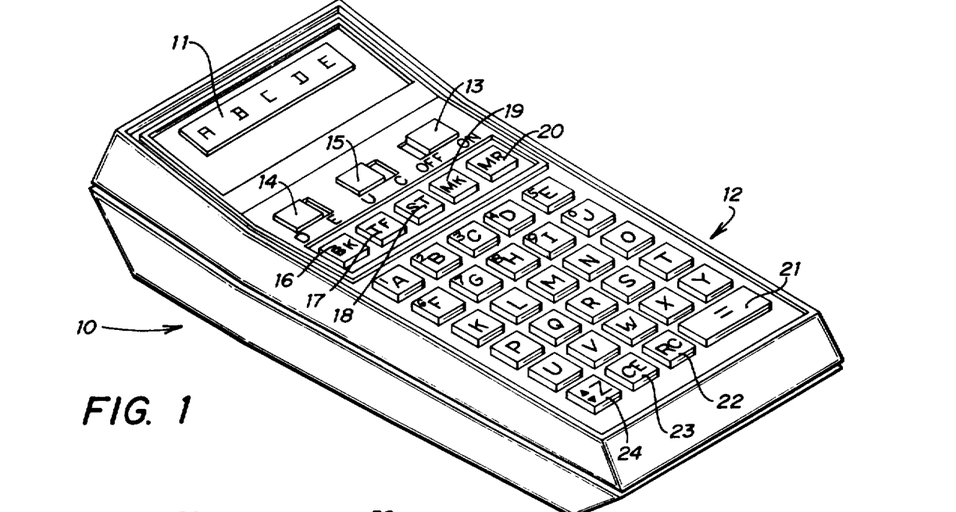
FIG. 1 is a perspective view of a cryptographic unit incorporating the present invention.

Referring to FIG. 1, a perspective view of a cryptographic device is illustrated. A housing 10 is set to any desirable configuration, the housing shown being shaped in the normal hand held calculator form which is well known. The housing 10 is dimensioned to be portable and capable of being hand held for being carried on the person and used at any time. In the preferred embodiment, housing 10 and its components has dimensions of 8 inches width × 3¾ inches length × 2 inches and a weight of 19 oz. including batteries. A display 11 is formed at the upper end of housing 10 and includes five sixteen-segment LEDs and the keyboard generally indicated at 12 is of the normal push button interrupt type. A power button off/on switch 13 is provided, along with a decipher/encipher switch 14 which determines the function desired to be operated in. Of further importance to the preferred embodiment and to be described later is the universal/custom switch 15 used to select either universal code or custom code depending on the level of security sought.

The BK push button 16 is used to enter the basic key variables. The TF push button 17 causes the enciphered test message to be recalled from memory, deciphered and displayed. Operation of button 17 is used to validate the key variables and proper operation of the unit. The ST push button 18 is the store push button which is used to enter, encipher and store any five character test message. The MK push button 19 is the message key push button which causes a random five character message key to be generated and displayed when the unit is in the encipher mode. If the decipher/encipher switch 14 is in the decipher mode, no message is displayed and the next five characters will be accepted by the unit as a message key. The MR push button 20 is the master reset push button which resets the cryptographic unit and causes the key generator to randomize.

Disposed on the lower right hand end of the keyboard 12 is the equal push button 21 which initiates the enciphering or deciphering of the character group entered. The RC push button 22 is the recall feature which restores the characters originally displayed prior to a time-out, to be described. If the decipher/encipher switch 14 is in the decipher mode, the RC push button 22 can be used as a local shift key which is useful in restoring the proper case between numeric and alphabetic characters whenever a transmission has garbled the cipher text character which would have been deciphered as a shift character. The CE push button 23 is the clear entry push button which removes all characters entered on the display 11. This push button is also used to recover from an error indication indicated by a flashing display. The Z push button 24 also operates as a shift key from alphabetic to numeric or from numeric to alphabetic when operating in the encipher mode.

The remainder of the keyboard 12 represents push buttons for each letter of the English alphabet. Note that in the preferred embodiment the push buttons for the letters A-J also serve as inputs for the numerals 1, 2, . . ., 9, 0 when the shift key 24 has been properly operated. As can be seen, the controls of the preferred embodiment consists of three slide switches and thirty-four push buttons. Twenty-six of the push buttons are for data entry and the remaining eight govern the display and variable entry functions.

In operating the preferred embodiment of the cryptographic unit, it is required that a basic key be entered to fully initialize the unit for enciphering and deciphering. This basic key is somewhat analogous to a safe combination and is essential to making the equipment function in the proper manner. Further, any other unit with which this device must communicate must also be loaded with exactly the same basic key. The basic key provides the unit with the capability of being unique from all others or similar only with any other units loaded with exactly the same basic key. It is possible for any other device to correctly decipher any enciphered message unless the same basic key has been entered.

While any number of segments could be incorporated, the basic key in the preferred embodiment consists of five segments. These five segments must be appropriately initialized A, B, C, D, and E, respectively. Each segment is exactly ten letters in length and the first letter of each segment must contain one of the specified letter names A-E. Nine additional random letters are then used to constitute each segment. The basic key is loaded by pressing the master reset push button 20 and then the basic key button 16. At this point five keyboard inputs are entered beginning with the initial letter input A. At the conclusion of five keyboard inputs, the equal push button 21 is pressed to enter these five inputs. Five further inputs are then made followed by pressing the equal push button 21 to enter these inputs.

At this point, the master reset push button 20 is again pressed, followed by the basic key push button 16 and a subsequent segment is entered as above. The initial letter of this segment should be B to indicate the second segment B. After ten keyboard inputs have been entered, the same process is followed for segment C, segment D and segment E. This basic key is the key to identifying a particular machine. All machines which are capable of communicating with a particular machine must have the same basic key. The basic key is thus maintained in a confidential manner and may be destroyed once the desired units have been properly loaded with the same basic key.

A particular segment may be changed by pressing the master reset push button 20, followed by depression of the basic key push button 16 and entering of the appropriate 10 input segment with the initial letter constituting the name of the particular segment to be changed. Note that in the preferred embodiment each segment is specifically named A, B, C, D, or E. Each segment must begin with a segment name, and, if any other input is used, the display 11 will flash, providing warning of an error in the input. In the preferred embodiment shown in the figures, only the letters A through P can be used as segment letter inputs.

To encipher a message once the unit is loaded with the basic key, after the power switch 13 has been switched on, the decipher/encipher switch 14 is set to the encipher E position. The master reset push button 20 is then pressed, which resets the unit and places the key generator in the randomizing state. The master key push button 19 is then pressed to automatically generate and display five random message key characters. The operator then writes down these characters as the first group of ciphered text. At this point, the first five characters of the plain text message to be enciphered are entered via the keyboard 12 and displayed on the display 11. The equal push button 21 is then pressed to encipher the entered group and the resulting cipher text appears on the display 11. This is recorded for later transmission. Then, in the same manner, the remainder of the plain text is keyed in and enciphered in five character groupings. Each character grouping is recorded spaced from adjacent character groupings for ease of decipherment.

If during entry of the plain text a mistake is made, the clear entry push button 23 may be pressed, and the five character group is erased for reentry of the proper five character group. Further, an error condition will exist if the number of characters entered prior to pressing the equal push button 21 is not exactly five or if an attempt is made to enter six characters. This error condition is indicated by a flashing display. Upon pressing the clear entry push button 23 the unit is then ready for proper entry.

After the entire message has been enciphered, the operator may transmit the message in any number of ways, such as over the telephone, by telex, by letter or the like. An unauthorized intercept of the message will be unable to determine the message due to the high level of encipherment provided by the system.

If the operator possesses an enciphered message and desires to decipher that message, the decipher/encipher switch 14 is set to decipher D and the message key indicated above must be entered as the first block of the five characters. This is done by pressing the master reset push button 20 and the message key push button 19, followed by entry of the five character message key code group. At this point, the equal push button 21 is pressed and the unit is ready for entry of the enciphered message. The enciphered message is entered in five character groupings, followed by pressing the equal push button 21, upon which the plain text will appear on the display 11. The recovery feature accomplished by pressing the clear entry push button 23 operates as above.

Note that if during operation no keys are pressed for a one minute or another predetermined time period, the display 11 incorporates a time out feature to conserve power. If a time out condition exists, the display is blanked except for a hyphen in the left-most character position of the display 11. Recovery from this time out condition is accomplished by pressing the recall push button 22 which restores all characters entered on the display prior to the time out condition.

Further, the unit has alphanumeric capabilities. A shift feature is incorporated to accommodate the numerals associated with the push buttons for the alphabetic letters A-J. As shown in the preferred embodiment, the Z push button 24 is used as a shift feature in the encipher mode. Each time the push button 24 is pressed, the present meaning of the appropriate push button is changed. For example, if the shift register push button 24 is pressed twice nothing has been changed. As cipher text is limited to 26 alphabetic characters, the shift register is not necessary in the decipher mode. In the decipher mode, the Z push button 24 is used to enter the character Z and does not cause a shift to occur. Note that the Z push button 24 will be displayed as a hyphen when entered in the encipher mode.

Also, the recall push button 22 has an additional function in the decipher mode. After any information is input, the recal push button 22 may be pressed and the display shifts from numeric to alphabetic or from alphabetic to numeric where possible. Accordingly, whenever any error is suspected in the enciphered text, such that a shift character may have been missed, the recall push button 22 may be used to check for this. In effect the message has not been altered but simply presented in alphabetic and numeric form.

An important aspect of the preferred embodiment is a test feature to assure the operator that the key variables originally stored in the nonvolatile memory are still valid. Use of the test feature thus prevents erroneous encipherment in case of a malfunction of the storage or other circuitry of the device. To use this test feature, the operator stores an enciphered five character test word in the machine by use of the ST push button 18. In order to store this test message, the operator sets the E/D switch 14 to the encipher mode. The master reset push button 20 is then pressed, followed by depression of the message key push button 19. At this point, five random message key characters are generated and displayed. The store push button 18 may now be pressed to store this message key group and notify the machine that the next five characters are test characters. These test characters are then entered and the equal push button 21 pressed. Thus, at this point, the test characters are enciphered and stored along with the previously generated message key in a dedicated portion of the unit's memory. Two separate test messages may be generated and stored, one for the universal code and another for the custom code as determined by the U/C switch 15.

In order to use the test feature and validate the basic key variables, the E/D switch 14 is set to the D position. The master reset push button 20 is pressed, followed by the test function push button 17. The test message which was enciphered and stored above will now be deciphered and displayed on the display 11 in plain text. This plain text message should correspond exactly to the original five character message. Typical test words used for storage in the test feature are "hello" or "start". This feature allows the operator the ability to instantly validate the correctness of the key variables as well as the proper operation of the machine.

The U/C switch 15 provides two levels of security. In the custom or C mode, a greater level of security is provided with $4.8 \times 10^{52}$ basic key variables being available in the preferred embodiment. In the preferred embodiment, the machine uses two of the five basic key segments to process messages in the universal mode. Thus, only the A and B segments are used in the universal mode, while in the custom mode all five segments are used. The universal mode accordingly generates a random stream composed of $1.2 \times 10^{21}$ key variables. In order to correctly process an enciphered message, the operator must thus know the correct basic key and message key, as well as the proper mode.

Figure 2:
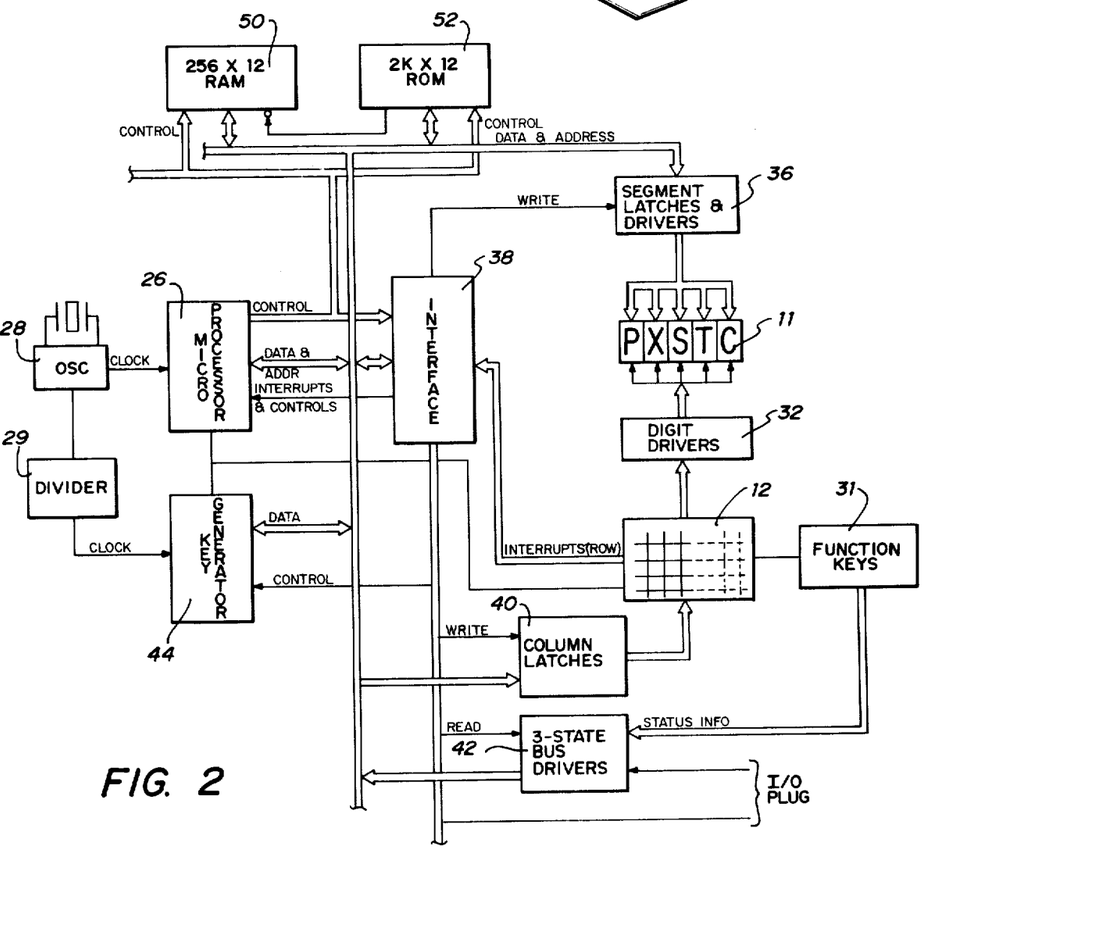
FIG. 2 is a block diagram of the cryptographic system of the present invention.

Referring now to FIG. 2 a block diagram of the basic sections of the cryptographic unit is shown, wherein like numerals are used for like and corresponding parts previously noted. A microprocessor 26 may comprise any appropriate CMOS microprocessor found in the art such as the Intersil 12-bit IM 6100. Microprocessor 26 controls the entire system. Timing for the system is provided by a crystal oscillator 28 and a divider 29. The microprocessor 26 first does an XY scan of the keyboard 12, pulsing and reading the X and Y lines to detect depressed buttons. Digit drivers 32 are connected between display 11 and keyboard 12 for displaying on display 11 the entered variables from the keyboard.

The data entered on keyboard 12 is fed into an interface 38 which stores the information in a latch 40, where the information is read by the microprocessor 26. The latch 40, which can be composed of a CMOS 4015 four-bit latch and CMOS 40174 six-bit latch, acts as a ten-bit shift register. Function keys 31, made up of keys 14–24, are connected to a tristate bus driver 42 which in turn feeds interface 38. This may similarly be accomplished via an input-output (I/O) plug connection.

The microprocessor 26 mixes the keyboard inputs with the output from a key generator 44, using a software algorithm to produce the purely alphabetic cipher text for display on display 11. The microprocessor 26 reads a read only memory (ROM) 52 and loads a random access memory (RAM) 50. At this same time, the microprocessor 26 is also feeding a segment latch and driver 36 according to the segments to be lighted on the display 11. Transistors 37 (FIG. 4) maintain proper driving voltage for the display 11 driven by the driver 36. Microprocessor 26, following instructions programmed into ROM 52, also performs a debounce function on the key inputs by means of a delay loop. The keyboard is continually read and compared until the inputs are alike.

Figure 3:
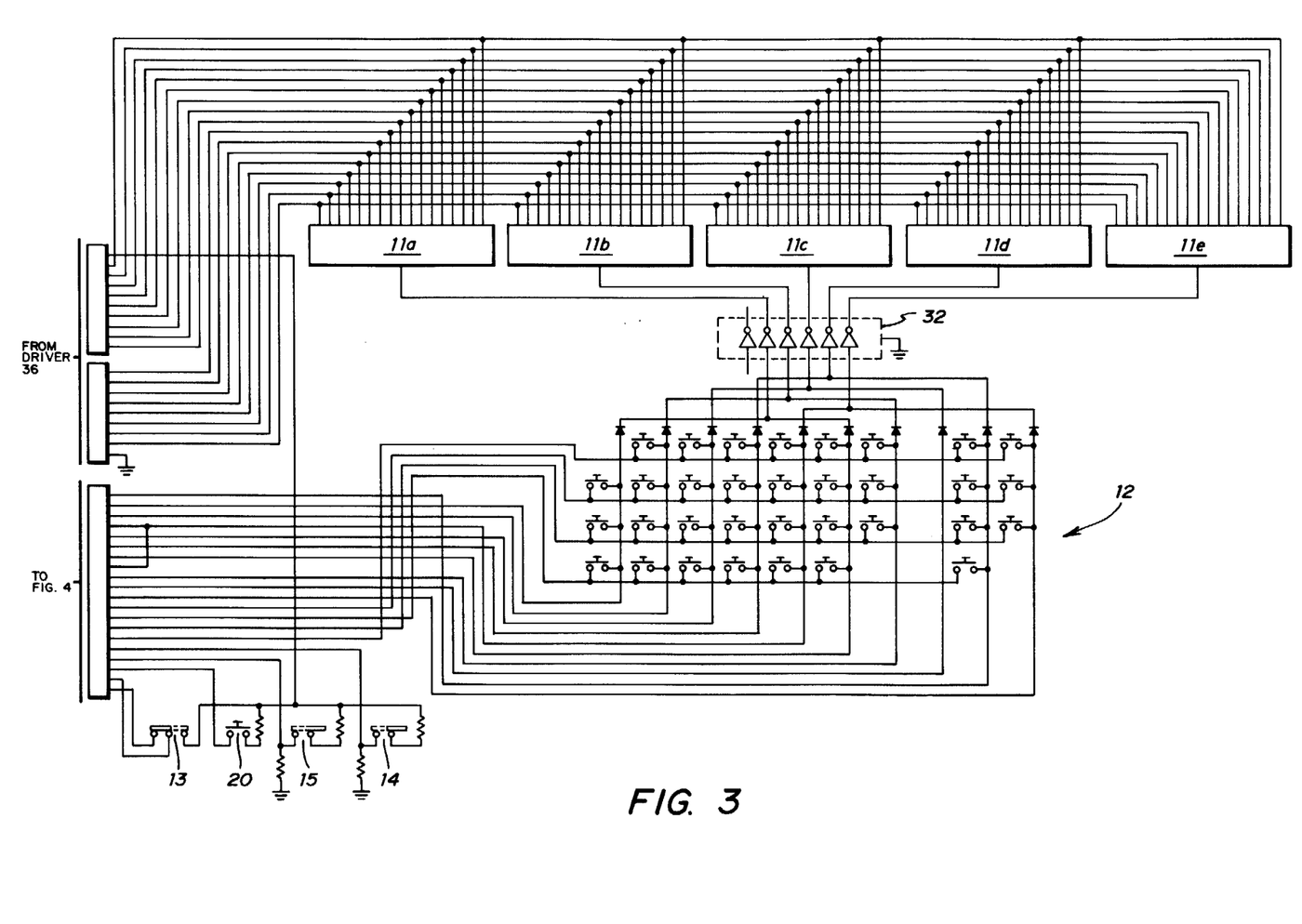
FIG. 3 is a schematic diagram showing the keyboard, digit drivers and display.
Figure 4:
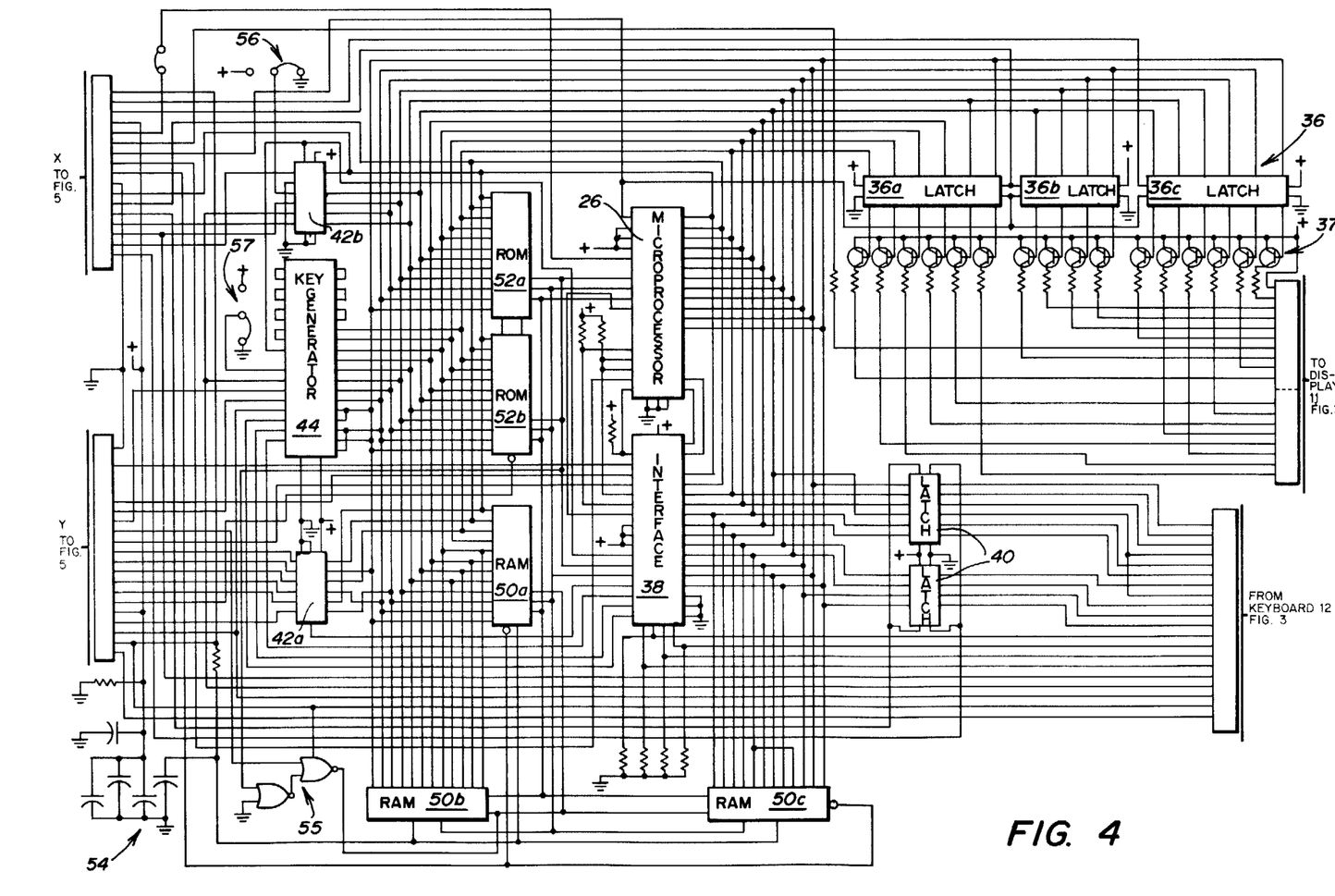
FIG. 4 is a schematic diagram of the internal circuitry of the present invention.
Figure 5:
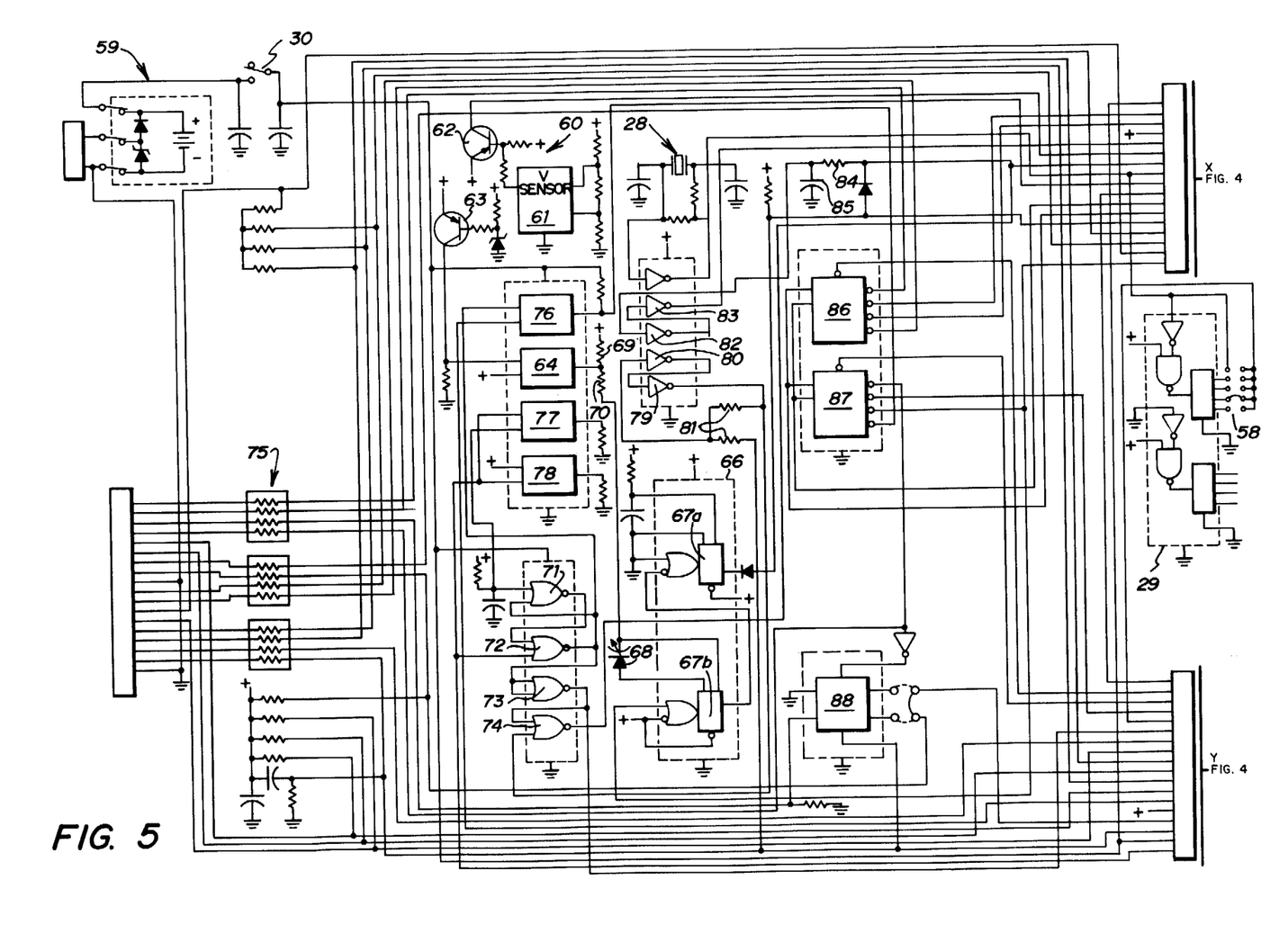
FIG. 5 is a schematic diagram of the power functions, clock, and external connections.

This block diagram is shown in detailed schematic form in FIGS. 3–5. In FIG. 3, the keyboard 12 is shown as an XY pattern of positive entry push buttons. The digit driver 32 comprises six inverter circuits connected to the display 11 which comprises a group of light emitting diodes 11a, 11b, 11c, 11d, and 11e. The power off/on switch is shown at 13, along with the master reset switch 20, the universal/custom switch 15 and the encipher/decipher switch 14.

In FIG. 4, the segment latches and drivers 36 are shown as receiving information from the microprocessor 26 in order to drive the light emitting diode display 11 (FIG. 3). The driver 36 is shown as comprising a 16-bit latch made up of two CMOS 40174 latches 36a and 36b and a CMOS 40175 latch 36c. Sixteen separate transistor drivers 37 supply current to the LED's in display 11 to light the appropriate segments. A peripheral interface element 38, which may be a CMOS IM 6101, is also shown as connected to receive information from the column latches 40 which have stored the information entered on the keyboard 12. The random access memory element comprises three RAMs 50a, 50b and 50c, each $256 \times 4$ to provide a total $256 \times 12$ capability. The read only memory element 52 comprises ROMs 52a and 52b, each a $2k \times 12$ CMOS ROM. The ROMs are mask programmable devices designed to be compatible with the IM 6100 microprocessor 26.

Key generator 44 is interconnected between the tristate bus drivers 42a and 42b which are basically buffers allowing the microprocessor bus to read data on command from the interface 38. Key generator 44 may comprise any suitable generator of a long series of pseudorandom digital bits, such as the key generators described in U.S. Pat. Nos. 3,781,473, 4,079,188, and copending application Ser. No. 741,014, assigned to assignee. A space option jumper is shown at 56 which, when the unit is in the decipher mode, automatically suppresses the display of a predetermined letter such as X used for word separation whenever it is read and the switch was on. This provides for a more readable display. A power filter is shown at 54, along with a memory protect feature 55 which protects the RAM 50 when the power is switched. Finally, a spoof option 57, such as one described in U.S. Pat. No. 3,781,472 and copending application Ser. No. 741,014 is provided to make the key stream a function of the cipher text generated by the unit. This prevents an unauthorized person from using a key stream obtained by reverse processing a plain text and cipher text to encipher or decipher another message. By enciphering with the key stream as a function of the cipher text, any key stream deduced from one enciphered message could not be used to generate another enciphered message acceptable for deciphering by the same device.

Referring now to FIG. 5, the divider 29 is shown as a dual 4-bit counter chip used to divide down the oscillator clock to provide the desirable system operating frequency. Because of the strap options indicated at 58, several different positions are available for different desired operation, although the unit is normally run at 250 kilohertz. The crystal oscillator itself is indicated at 28.

A power block is indicated at 59 with capabilities for a charger input. The switch 30 disconnects if the case to the unit 10 is opened, thereby preventing operation of the unit. This disconnection causes deenergization of RAM 50 by applying a short circuit to the power pin of the RAM 50 to erase the key variables. Input/output plug capabilities also exist to receive a reader, a loader or a printer and the unit is protected from foreign matter by interface resistors generally indicated at 75.

A voltage monitor circuit is generally indicated at 60 which acts to maintain a constant battery voltage. If the battery voltage reaches a certain predetermined level on the way down to possible discharge, the output of the voltage sensor 61 will drive the transistor 62 into conduction in order to supply current to the decimal points in the display. When all the decimal points light up on the display, the operator is warned that the power available is getting low.

Display circuitry is shown as comprising transistor 63, gate 64 and the multivibrator generally indicated as 66. Multivibrator 66 includes one shot multivibrators 67a and 67b which feed each other in order to provide a delay feature. As the microprocessor 26 registers information in the column latches 40, it also clocks multivibrators 66. At this moment the multivibrator times out and provides a delay which determines the length of time that the display is going to be on. When the time out period is reached, one shot 67a fires and provides a reset pulse on a clear line to the column latch 40. This determines the length of time that the display is going to be on.

Power voltage is controlled through the transistor 63 which has a Zener diode in its base. As the battery voltage varies up and down, the capacitance of the varactor 68 varies to provide different pulse widths out of the multivibrator 67b. As the voltage goes down, the pulse width increases and maintains constant energization of the display. This is a non-linear type operation through the varactor 68 and as the voltage increases to a point around 5.6 volts the amount of power being drawn by the display must be cut down. The transistor 63 acts to serve this purpose. The transmission gate 64 is a common one stage gate. As the voltage reaches the high level, approximately 5.6 volts, the transistor 63 conducts and provides a high control signal through the gate 64. This effectively shorts the resistor 69 shortening the time constant in the one step function. Shortening the time constant then shortens the unit the entire way through, shortening the pulse width to the display via the varactor 68. Thus, the varactor 68 has continued operating, but, while it normally operates biased by resistors 69 and 70, when the transistor 63 shorts through transmission gate 64, resistor 69 is cut out, thereby changing the time constant of the system as the varactor 68 is only biased by the resistor 70.

Also, NOR gates 71 and 72 act to debounce the power switch 13. NOR gate 73 acts as a buffer, and NOR gate 74 gates through the master reset. The master reset is made up of the master reset key and the output of 73 which create a signal through to the microprocessor. The purpose of this is to protect the unit as the slide switch reaches the off side and before the power actually dies to zero. At the same time that contact is made on the off side of the power switch, solid-state switch 76 is cut off to prevent any RAM select signals from the ROM from reaching the RAM 50.

Gates 77 and 78 provide interfacing to the NOR gates 71 and 72. These act as a current sink. Inverters 79 and 80 act in conjunction with the resistor pair 81 to provide a Schmidt trigger which takes the master clear signal from the keyboard and modifies it for use through the circuit. Inverters 82 and 83 act as buffers acting in conjunction with resistor 84 and capacitor 85 to provide a delay from the power-on signal. This puts the processor in the run mode by delaying the start from zero power-on. The flip-flops 86 and 87 act as decoders to provide greater output than available from the peripheral interface unit 38. Flip-flop 86 is a 2 to 4 decoder, as is the flip-flop 87. 88 is also a flip-flop providing interfacing for the loader.

The flow charts for operating this system are shown in FIGS. 6–22. As noted, the primary control functions of the present system are programmed in the microprocessor 26. Referring now to the start position of FIG. 6, the unit is initialized at step 100. As described, the keyboard is pulsed to scan the output at 102. If a reader is not being used, the unit proceeds to determine whether a key was pressed at 104. If a reader is being used, the character from the reader is read and placed into the keyboard input registers or column latches 40 according to the steps shown in FIG. 21. If a key was pressed or a reader character read, the character is retrieved at 106 by ROM 52 to perform a debounce on the key at 108 by means of a delay loop. The character is read again at 110 to compare the two characters at 112. At a point where the characters are similar, the unit proceeds to the execute portion of the program (FIG. 7) if the time out feature 114 has not been incorporated. If the time out feature 114 has been incorporated and the character pressed was the recall at 116, the unit also proceeds to the execute program (FIG. 7). If not, a keyboard scan 102 is again performed.

Figure 6:
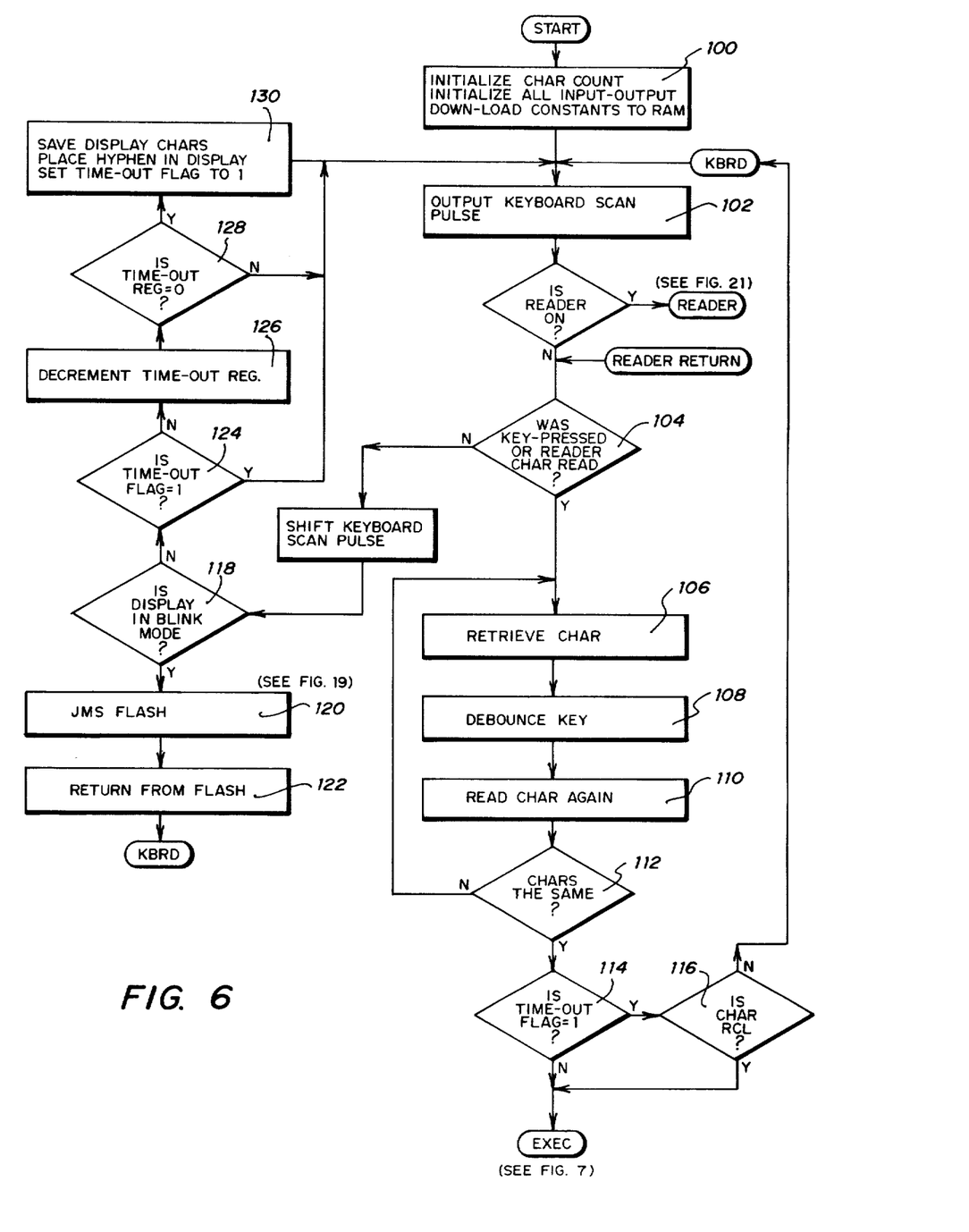
FIG. 6 is a flow chart of the initialization and keyboard scan functions.
Figure 7:
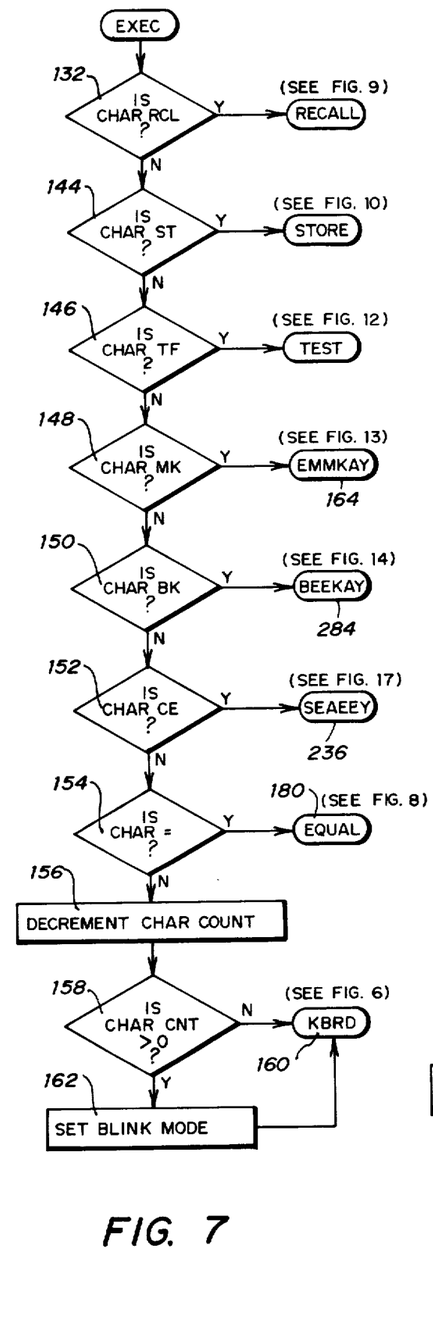
FIG. 7 is a flow chart of the execute function.

Returning to the scan portion of FIG. 6, if a key was not pressed or a reader character was not read at 104 the device then looks for an error at 118. If an error condition exists, the program jumps to the subroutine FLASH at 120 shown in FIG. 19. It is necessary to press the return button to recover from the error condition at 122. The FLASH subroutine will be discussed in more detail.

If an error condition does not exist at 118, the program checks for a time out condition at 124. If a time out condition does exist, the keyboard scan 102 is again made to check for a recall character. A loop is thereby entered conserving energy consumption until a recall character is entered. On the other hand, if a time out condition does not yet exist at 124, the time out register is decremented at 126, and, if the time out period has been passed at 128, the display characters are stored and a hypen is placed in the display to indicate a time out condition at 130. If the time period requirement for a time out condition has not been reached, a keyboard scan is again repeated.

If an input has been read, the unit then proceeds to the EXECUTE program as shown in FIG. 7. The unit again checks to see if the character is a recall at 132, and, if so, it then proceeds to the RECALL program shown in FIG. 9. If a recall character has been entered, the program checks to determine if the display is in a time out condition at 134. If so, the hyphen is removed from the display and the characters are restored from storage to the display at 136. The character count is simultaneously initialized and the program returns to keyboard scan at 138. If the display is not in a time out condition at 134, the device then checks to determine if the unit is in an encode or encipher mode at 140. If so, the unit also returns to the keyboard scan at 138. If in a decipher or decode mode, the case of all characters in the display is changed at 142, thus rendering alphabetic data as numerics or vice versa, and the unit returns to the keyboard scan.

Returning to FIG. 7, if the character input is not a recall, the program then checks to determine if the character is a store input (STORE) at 144. Similarly, the EXECUTE program continues through to check for a test function (TEST) 146, a message key (EMMKAY) 148, a basic key (BEEKAY) 150, a clear entry (SEA-EEY) 152, and an equal condition (EQUAL) 154. These represent the control keys on the keyboard 12 that are not one of the twenty-six alphabetic characters. If none of these control keys is found the character count is decremented at 156, and, if zero at 158, the program simply returns to the keyboard scan at 160. If a character count greater than zero exists an error condition then is properly initiated at 162, and the program returns to the keyboard scan 160. The character count is initialized at a +5 and decremented for each input. In the same manner, the character count could be initialized at a −5 and receive an increment for each input.

As the scan routine of FIG. 6 is being performed, the column latches 40 of FIG. 4 are being loaded. Similarly, the pulses in the keyboard are driving through the driver 32 of FIG. 3 to display 11. As the operator presses a key of the keyboard 12, the row lines are interrupted feeding information into the peripheral interface element 38. XY positions in the keyboard grid are defined by interrupts in the row lines. At the same time, the microprocessor 26 is determining which character has bee input and accessing the ROM 52. This ROM selects the appropriate segments of the display 11 LEDs to light through the segment latches and driver 36.

Figures 10, 11, 12, 13:
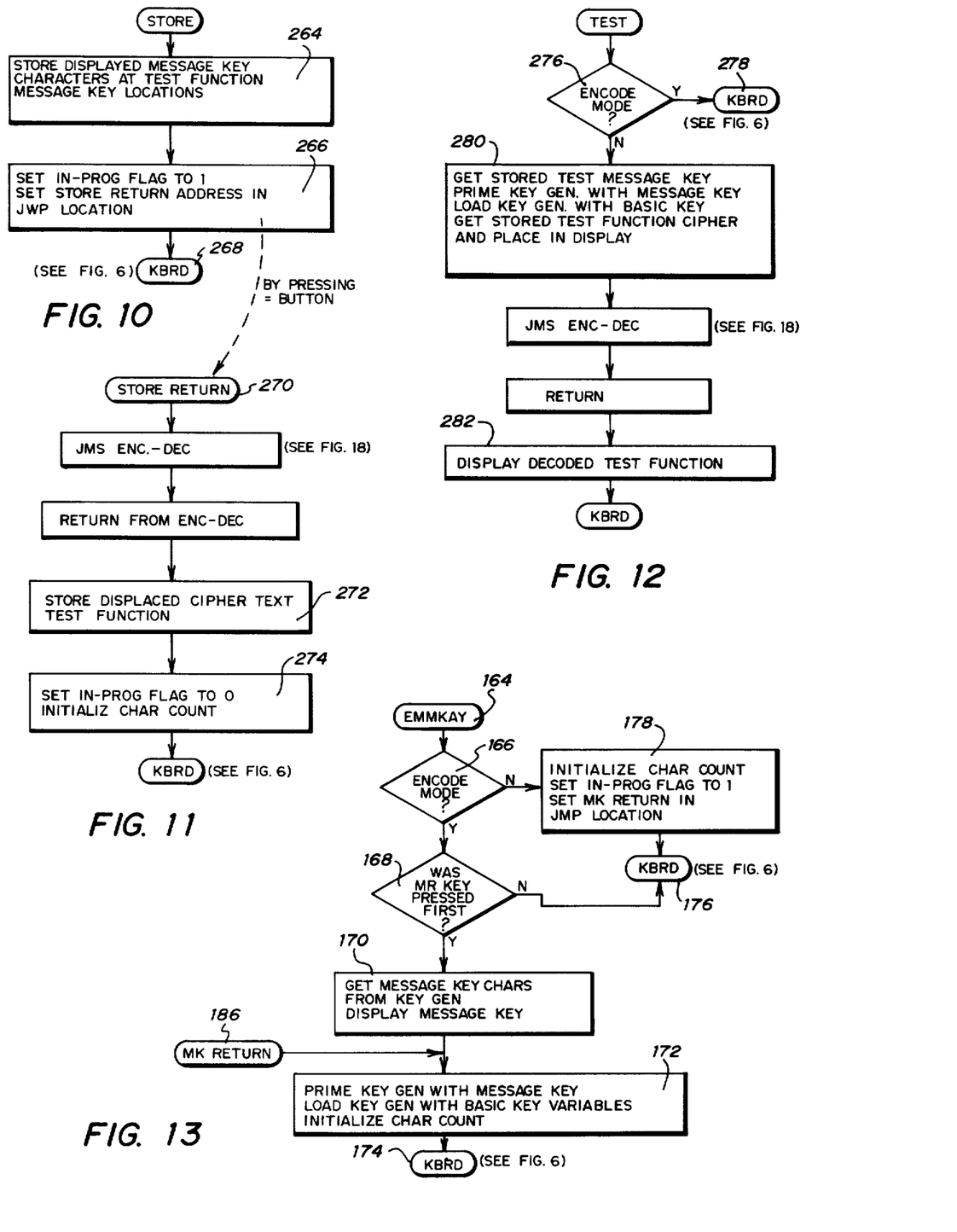
FIG. 10 is a flow chart of the store function.
FIG. 11 is a flow chart of the store return function.
FIG. 12 is a flow chart of the test function.
FIG. 13 is a flow chart of the message key function.

Looking now to FIG. 7, in the normal operation of the device, the master reset key is pressed and read at 148 followed by the message key shown as EMMKAY at 164. The EMMKAY routine is shown in FIG. 13 in which it is determined whether the device is in the encipher/encode or decode/decipher mode at 166. If the device is in the encode mode, the device will look at 168 to determine if the master reset key was pressed first. If so, a message key is retrieved from the key generator and displayed at 170. The key generator is correspondingly primed with the message key and loaded with the basic key variables at 172. The character count is also initialized before returning at 174 to the keyboard scan of FIG. 6. If the master reset key was not pressed first the unit also returns at 176 to the keyboard scan routine of FIG. 6 but without generating the message key and initializing the unit. The key variables are loaded into the RAM 50.

If, when the unit looks at 166 to determine if it was in the encode mode, the machine was in the decode mode at the time of pressing the message key, the unit is then looking for an input of five characters at 178. In order to do this, it returns to the keyboard scan at 176 and awaits for the entry of five characters. At the end of the entry of five characters, the equal button will be pressed at 154 in FIG. 7 which will activate the EQUAL 180 program charted in FIG. 8. The character count at this point 182 should be zero and is accordingly reinitialized at 184. From FIG. 13, when the device found that it was in the decode mode at 166, the in progress flag should have been set to one at 178. At the same point 178 in FIG. 13, the message key return is set in a jump location which physically means setting the address in the RAM 50. Continuing with the decode routine the program does a jump indirect through to the jump location in the RAM 50. At this point the unit is going to take the address of what is then placed in the jump location and retrieve the contents of this address which will say MK RETURN 186.

Figure 8:
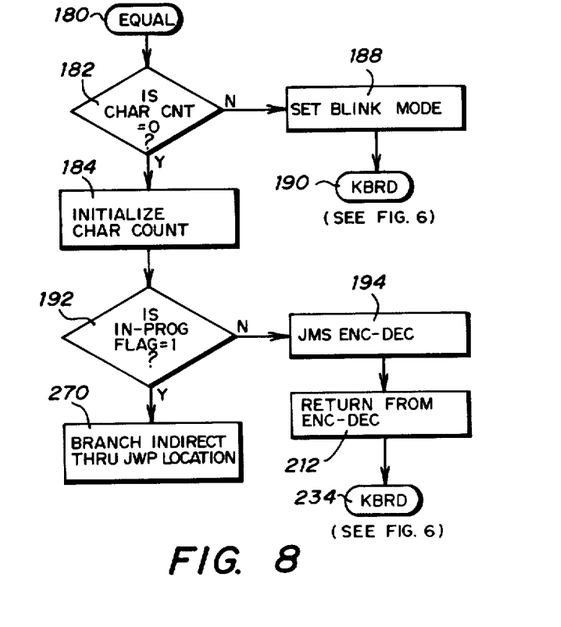
FIG. 8 is a flow chart of the equalization function.
Figures 14, 15, 16, 17, 18:
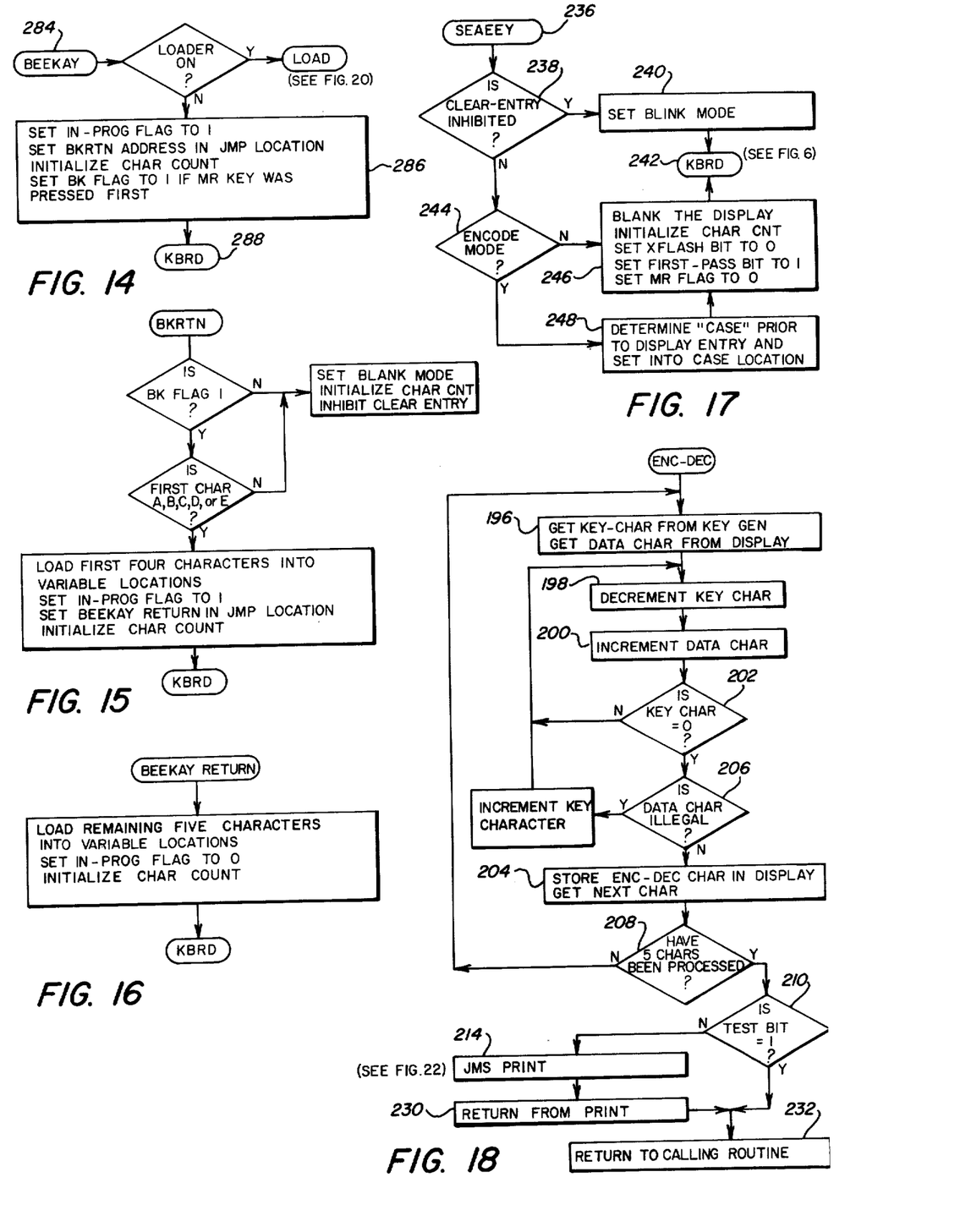
FIG. 14 is a flow chart of the basic key function.
FIG. 15 is a flow chart of the basic key return function.
FIG. 16 is a flow chart of a terminal portion of the basic key return function.
FIG. 17 is a flow chart of the clear function.
FIG. 18 is a flow chart of the encipher/decipher function.

Again looking at FIG. 8, if the character count is not equal to zero at 182, an error condition 188 exists, and the unit will return to the keyboard scan at 190. Further in FIG. 8, if the in progress flag is not equal to one at 192, the program will jump at 194 to the subroutine ENC-DEC shown in FIG. 18. The in progress flag will be equal to one at 192 only when doing functions similar to loading the message key. This effectively acts as a holding function. If we were in the encode mode, the device would proceed to the ENC-DEC routine. This is shown in FIG. 18 where the unit retrieves the five characters and the display.

At this point 196, a key character is retrieved from the key generator. A key character count is decremented at 198 while the data character count is incremented at 200, and, at the point the key character is equal to zero, 202, the display character is also stored at 204 in order to retrieve the next character. Note that the data character must be a legal entry, 206, of the alphabetic or numeric characters. At 208 when five characters have been processed, the device proceeds in 210 to determine if the device is in a test function condition. If so, the test bit would equal one at 210 and the device would return to the EQUAL routine at 212 of FIG. 8. In the normal situation the unit would jump at 214 to the subroutine PRINT shown in FIG. 22.

Figure 22:
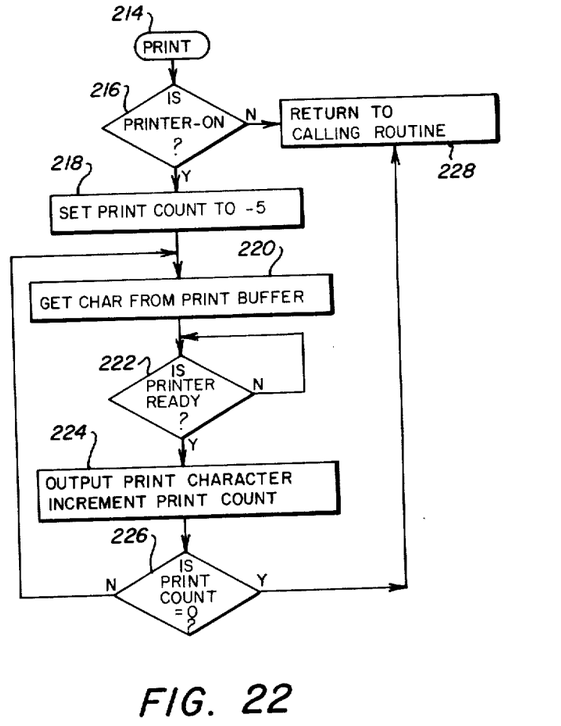
FIG. 22 is a flow chart of the print function.

If the printer is on at 216, the print count is set to a −5 at 218, and a character is retrieved from the print buffer at 220. At the point 222 the printer is ready, the character is output, and the print count is incremented at 224 before returning to the print buffer at 220 to retrieve another character. After five characters have been printed and the count is equal to zero at 226, the calling routine is returned at 228, which in the case just mentioned would be the return from print position 230 in FIG. 18. Looking at FIG. 18 after returning from the print routine, the program further returns to the calling routine at 232 which in this situation was the equal routine of FIG. 8. At this point 212, the EQUAL routine returns at 234 to the keyboard scan of FIG. 6.

In the encode/decode routine, the microprocessor 26 first retrieves a seven-bit key character from the key generator 44 and reads a data character in the display 11. The data characters have been stored in the RAM 50 for use. The key character is then decremented as the data character is incremented until the key character is zero. At this point, if the data character was a proper input from the keyboard, the data character now generated is stored and a new character is read. For instance, assume that the key generator character retrieved is 0000101 and the data character is an A, which could be represented as 0000001. The key character would then be decremented to 0000100 and the data character incremented to 000010. This would continue until the key generator character is 0000000 and the data character is 0000110. This is the cipher text for a character which has been preassigned a seven-bit address. In this case, it might be the designation for an N. An "N" accordingly is displayed on the display 11.

This process occurs virtually immediately for the five characters entered. Similarly, further groups of five characters may be entered. For each character, a key generator character is retrieved from a random sequence and decremented to zero to obtain an enciphered or deciphered text which has simultaneously been incremented from the entered text.

Figure 9:
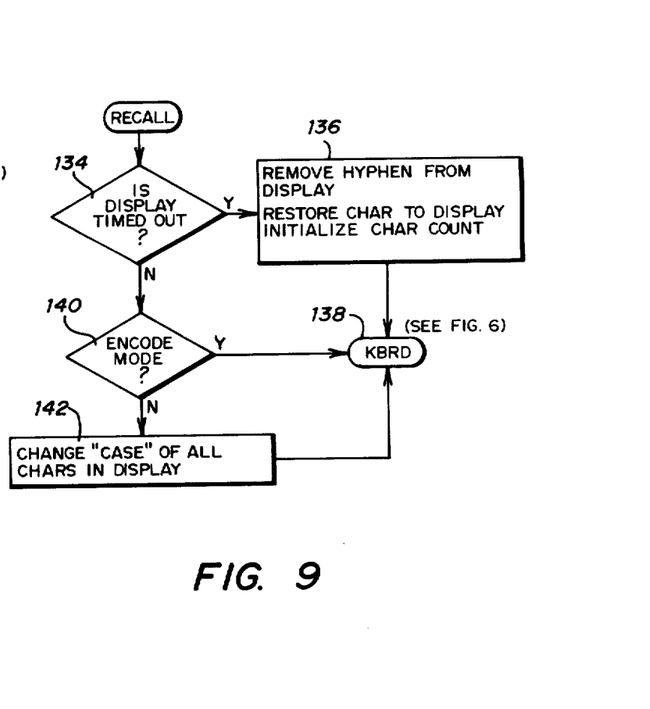
FIG. 9 is a flow chart of the recall function.

Returning now to FIGS. 6 and 7 and the RECALL program previously mentioned at 116 and 132, this routine is particularly shown in FIG. 9. This feature has two functions, one each in the encode and decode modes. If the unit is in the encode mode, the RECALL feature acts to recall the display after it has been timed out and stored away. If the unit is in the decode mode, the RECALL feature acts to shift the display characters from alphabetic to numeric or vice versa.

Another feature of interest is the clear entry feature reached through FIG. 7 at 236 and shown in the routine SEAEEY in FIG. 17. The program first determines at 238 if the clear entry is inhibited which will occur when there is a key generator failure. This will activate the alarm feature at 240 and return the program at 242 to the keyboard scan. Otherwise, at 244, if the device is in the decode mode, the display will be blanked at 246, and the character count will be initialized. This allows the operator to clear any mistakes that have been made and allows a new entry of the data. If the unit is in the encode mode, the program first determines at 248 what case the unit is in prior to displaying any entry and sets this case. Then, just as in the decode mode at 246, the display is blanked and the character count is initialized. Further, the status registers X FLASH BIT and master reset flag are set to zero, and the FIRST-PASS BIT is set to one.

Figure 19:
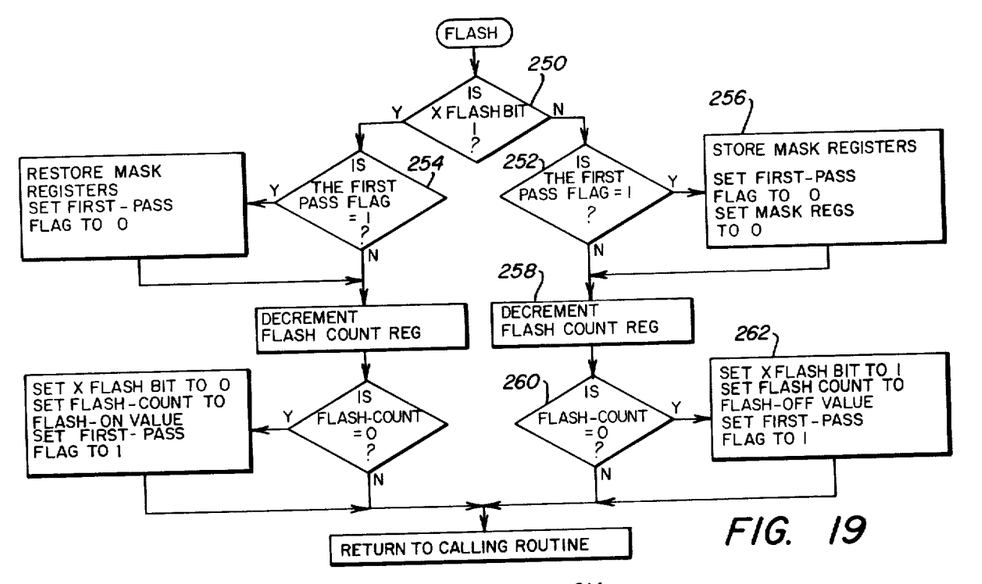
FIG. 19 is a flow chart of the error warning system.

If the subroutine FLASH has been activated and no error condition exists, the X FLASH BIT becomes important in the FLASH subroutine shown in FIG. 19. If the display is off, the X FLASH BIT will be equal to zero at 250. If the display is on, the X FLASH BIT will be equal to one at 250. The FIRST PASS FLAG at 252 and 254 determines whether the routine is being passed through for the first time in either the off or on mode. If the FIRST PASS FLAG at 252 is equal to one, the program stores the information in the masked registers at 256. Masked registers are a set of registers in the RAM corresponding to the locations that contain characters to be displayed. Whenever a character is retrieved from the RAM character location, it is compared with the masked location before it is displayed. This insures proper display.

At the same time the masked registers are set to zero in 256, the program is at a point 258 to decrement the FLASH COUNT register. The number in the FLASH COUNT at 260 register determines the length of time that the display is going to be either off or on. At a point where the register has counted down to zero, a yes answer in the program is obtained, and the X FLASH BIT is set to one at 262. The FIRST PASS FLAG is also set to one and the FLASH COUNT is set to a FLASH OFF value. The next time through the program, the other side of the program will be used. This creates the flashing effect.

Two important features are the store function and test function which allow the operator to verify that the key variables are still valid. These programs are shown in FIG. 10 and FIG. 12, respectively. To activate the store feature, the operator presses the master reset button while in the encode mode at 168 in FIG. 13 as previously discussed. The message key is then also pressed as at 148 in FIG. 7 to generate a five character message key. At this point, 144 in FIG. 7, the store button is pressed to store the displayed message at a specific test function message key location at 264. Different locations exist for the universal and custom levels of security. The in progress flag is set to one at 266 and a return address is set in a general location. At this point 268, the keyboard scan is returned to read the test message entered by the operator. The EQUAL program is then called at 154, in FIG. 7, and, as the in progress flag has been set to 1 at 266 in FIG. 10 and the EQUAL routine reads this at 192 in FIG. 8, the STORE RETURN in FIG. 11 is activated at 270 in FIG. 8. The enciphered message is stored at 272 and the in progress flag set back to 0 at 274. Also the character count is initialized for new entry.

The test function, FIG. 12, is activated by pressing the test function button at 146 in FIG. 7 in the decipher mode at 276 in FIG. 12. If the unit is in the encode mode, the unit returns at 278 to the keyboard scan program. If the unit is properly in the decode mode at 276, the stored test message key is retrieved at 280 for decoding and display. This is done electronically by the microprocessor 26 which retrieves the information from the RAM 50 and primes the key generator with a message key and loads the key generator with the basic key. In this manner the originally entered plan text is displayed again at 282 as the same plain text.

Referring now to FIGS. 14, 15 and 16, the loading of the basic key can be followed. This point is obtained after pressing the master reset and basic key buttons at 150 in FIG. 7. It should be remembered that the basic key is made up of five segments, each beginning with a letter A-E which acts as a name of the segment. The first segment accordingly begins with the letter A and after loading four more variables the equal key is pressed. Then five more variables are entered to make up a ten character segment. The first time through the basic key program at 284 in FIGS. 7 and 14, the in progress flag is set to one and a basic key return address is set at 286. The character count is initialized, and the basic key flag is set to one if the master reset key was pressed first. The in progress flag is now equal to one and after returning at 288 to the keyboard scan (FIG. 6) to read five characters, the EQUAL routine would be called at 154 in FIG. 7. As the in progress flag equals one at 192 in FIG. 8 the program jumps at 270 to the breaker return (BKRTN) program shown in FIG. 15.

The BKTRN program shown in FIG. 15 is used to receive the first five characters of the basic key segment. The second five characters will enter through the program shown in FIG. 16, BEEKAY RETURN. Each time, the return address is set to the other program in order to receive the entry. Note that the universal code normally uses the first two segments, A and B, while the custom code will use all five segments.

Figure 20:
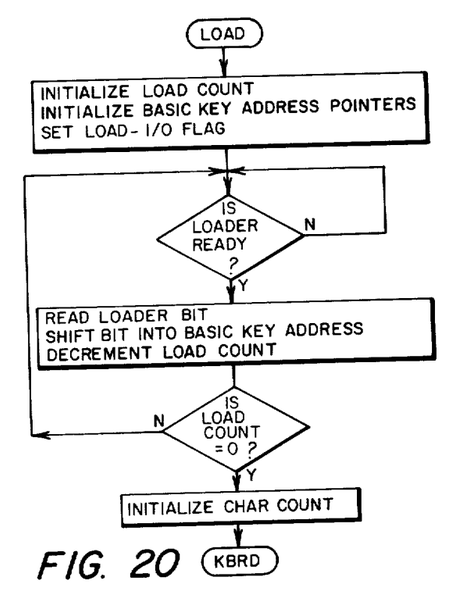
FIG. 20 is a flow chart of the load function.

Another feature shown is the LOAD program in FIG. 20 for using another unit designed to include a special program to make it a loader. One could output variables from that machine into the receiving machine. This allows more rapid entry of variables. The machines would be plugged together and the master reset and basic key buttons pressed on each machine. Then, as shown in this routine, a read function would begin and the basic key variable bits would be placed into the memory of the receiving machine. Similarly, the test function in the message key would be loaded.

Figure 21:
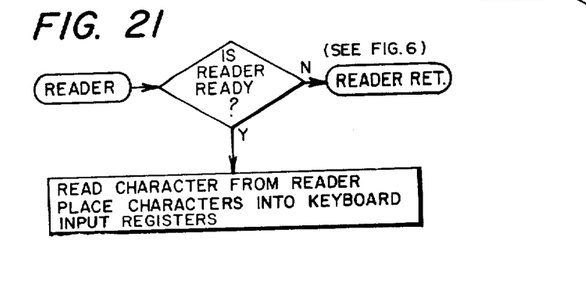
FIG. 21 is a flow chart of the reader function.

The reader shown in FIG. 21 has already been discussed. This feature would allow a quicker enciphering function. In lieu of the keyboard, a reader input would be used through an interface plug. In using the reader, a printer as shown in FIG. 22 would also be used. When using a reader, the display would be operating so fast that without the use of the printer, the material would not be able to be read. Further, the printer could be used to take a printout instead of having an operator copy the material.

Although preferred embodiments of the invention have been illustrated in the accompanying drawings and described in the foregoing detailed description, it will be understood that the invention is not limited to the embodiments disclosed, but is capable of numerous rearrangements, modifications, and substitution of parts and elements without departing from the spirit of the invention.

What is claimed is:

1. A cryptographic device comprising:
 a housing;
 a keyboard on said housing for inputting a plurality of bits of information;

a display on said housing for displaying said list of information input through said keyboard;

circuitry within said housing responsive to said keyboard inputs for controlling said display;

means in said housing for enciphering said bits of information displayed on said display; and said circuitry operable to remove said displayed keyboard inputs and to display said enciphered bits of information;

wherein said keyboard comprises:

a plurality of keys each representative of a different letter of the alphabet;

shift means for a plurality of normally alphabetic keyboard inputs to provide numeric input capability; and circuitry responsive to said shift means and controlling said display to display numeric inputs; and means for shifting said display between alphabetic and numeric state to insure validity of deciphered keyboard inputs.

2. A portable hand-held cryptographic device comprising:

a housing dimensioned to be carried on the person of the operator and to be hand held during operation;

a keyboard on said housing for inputting N characters;

display means on said housing for displaying said N characters;

means for storing a basic key sequence entered through said keyboard;

a random code generator for generating a long sequence of randomized characters in dependence upon said basic key sequence;

circuitry within said housing for generating and displaying a randomized multi-character message key indicative of the starting point of said random code generator;

means for enciphering said displayed N characters with said randomized characters; and means for removing said displayed N characters and replacing them with N enciphered characters.

3. The cryptographic device of claim 2 wherein said housing, keyboard, display and circuitry are self-contained and operated by battery power for portability.

4. The cryptographic device of claim 2 wherein said display displays alphanumeric characters input through said keyboard.

5. The cryptographic device of claim 2 and further comprising means to clear all inputs entered for reentry of new inputs.

6. The cryptographic device of claim 2 and further comprising means to indicate an error in entry of said characters.

7. The cryptographic device of claim 6 and further comprising means to recover from said error indication for reentry of new inputs.

8. The cryptographic device of claim 2 further comprising means for blanking said display after a predetermined time period passes without further inputs and means for recalling said blanked display.

9. The cryptographic device of claim 2 wherein said keyboard comprises:

a plurality of keys each representative of a different letter of the alphabet;

shift means for a plurality of normally alphabetic keyboard inputs to provide numeric input capability; and circuitry responsive to said shift means and controlling said display to display numeric inputs.

10. The cryptographic device of claim 9 further comprising means for shifting said display inputs between alphabetic and numeric state to insure propriety of deciphered keyboard inputs.

11. A cryptographic device comprising:

a housing;

a keyboard on said housing for inputting a plurality of enciphered characters;

a display on said housing for displaying said bits of information input through said keyboard;

random code generator circuitry within said housing for receiving a predetermined message key and setting the operation of said random code generator in response thereto;

means for controlling said random code generator to decipher said keyboard inputs of enciphered characters;

circuitry operable to remove said displayed keyboard inputs and to display said deciphered characters; and means to indicate the entry of information in an improper sequence or in a segment of improper length for inputting through said keyboard and display.

12. The cryptographic device of claim 11 wherein said housing is constructed to be portable and hand-held.

13. The cryptographic unit of claim 11 wherein said housing, keyboard, display and circuitry are self-contained without the need for external connections for ease of operation and for portability.

14. The cryptographic device of claim 11 further comprising means to clear the bits of information entered on said keyboard and displayed on said display for reentry of new inputs.

15. The cryptographic device of claim 11 further comprising means to recall said circuitry from said error indication for reentry of proper inputs.

16. The cryptographic device of claim 11 further comprising:

means for blanking said display after a predetermined time period passes without further inputs through said keyboard;

storage means for retaining information on said blanked display prior to blanking; and means for retrieving said blanked inputs from said storage means.

17. A cryptographic device comprising:

a housing;

a keyboard on said housing for inputting a plurality of enciphered characters;

a display on said housing for displaying said bits of information input through said keyboard;

random code generator circuitry within said housing for receiving a predetermined message key and setting the operation of said random code generator in response thereto;

means for controlling said random code generator to decipher said keyboard inputs of enciphered characters;

circuitry operable to remove said displayed keyboard inputs and to display said deciphered characters; and means for shifting said display inputs between alphabetic and numeric state to insure propriety of deciphered keyboard inputs.

18. A cryptographic device comprising:
a housing;
a keyboard on said housing for inputting a plurality of bits of information;
a random code generator having a plurality of possible starting points for generating randomized key streams;
circuitry within said housing for receiving a multi-input basic key comprised of a plurality of segments that are of a predetermined length for inputting through said keyboard and circuitry;
said circuitry responsive to said multi-input basic key to fully initialize the starting point of operation of said random code generator; and
means operable to utilize different groups of said basic key segments to generate different lengths of random key streams to provide selectable different levels of security of operation of said device;
the first bit of information in at least one of said segments of predetermined length being utilized by such circuitry for identification and substitution of a new segment with the same first bit of information but a different segment of remaining bits of information of said predetermined length.

19. The cryptographic device of claim 18 wherein said circuitry within said housing can be initialized through said basic key at a position synchronized with any second device receiving said basic key.

20. The cryptographic device of claim 18 wherein said multi-input basic key is entered in segments of 10 bits of information comprised of two groups of five bits of information:
the first bit of information of said first group of five bits of information being utilized by said circuitry to address said segment of 10 bits of information for identification in operation and substitution of a new segment with the same first bit of information but a different segment of 10 bits of information.

21. The cryptographic device of claim 20 further comprising means to operate in a universal mode utilizing two basic key segments and a custom mode utilizing more than two basic key segments to provide different lengths of random code generated randomized key streams.

22. A portable cryptographic device comprising:
a housing;
a keyboard on said housing for inputting a plurality of bits of information;
a display on said housing for displaying keyboard inputs;
circuitry within said housing for enciphering said displayed keyboard inputs;
means for storing said enciphered keyboard inputs; and
test means for deciphering said stored enciphered keyboard inputs and for displaying said deciphered inputs on said display to provide a test comparison to the original input information to insure proper operability of said cryptographic unit and validate the correctness of key variables.

23. The portable cryptographic device of claim 22 further comprising:
a random code key generator for generating a stream of randomized key characters;
circuitry within said housing for receiving a multi-input message key generated by said random code generator; and
means for recalling said message key to prime said random code generator to decipher said stored original information input through said keyboard.

24. A miniaturized portable hand-held cryptographic device comprising:
a self-contained portable housing dimensioned to be hand-held;
a keyboard on said housing having a plurality of keys each representative of a different letter of the alphabet;
a display on said housing for displaying a plurality of letters;
solid state electronic circuitry within said housing and responsive to operation of said keyboard for causing plain text letters to be displayed on said display;
said electronic circuitry further including coding circuits for enciphering the letters displayed on said display;
said electronic circuitry operable for removing the displayed plain text letters and for displaying the enciphered letters on said display;
means for addressing said plain text letters with a predetermined multiple-bit character;
circuitry for generating a randomized multi-bit character;
means for incrementing said plain text multi-bit character while simultaneously decrementing said randomized multi-bit character;
means for registering said incremented plain text multi-bit character when the said decremented randomized multi-bit character equals zero;
means for assigning a predetermined plain text letter to said registered incremented plain text multi-bit character; and
circuitry for removing said displayed originally entered plain text letter and for displaying the registered incremented plain text letter.

25. The miniaturized portable hand-held cryptographic device of claim 24 and further comprising circuitry for storing said plurality of letters entered on said display and for blanking said display to conserve power consumption.

26. The miniaturized portable hand-held cryptographic device of claim 25 wherein said circuitry places a signal in the position on said display for one letter input through said keyboard to indicate entry into a power conserving state.

27. The miniaturized portable hand-held cryptographic device of claim 24 wherein said circuitry includes a random access memory to manipulate data received through said keyboard.

28. The miniaturized portable hand-held cryptographic device of claim 27 wherein said random access memory is maintained at an operable voltage despite non-operation of device.

29. The miniaturized portable hand-held cryptographic device of claim 28 wherein said constant voltage is grounded if said housing is opened, said grounding acting to remove said operable voltage from said random access memory and render it inoperative.

30. The miniaturized portable hand-held cryptographic device of claim 24 wherein said circuitry includes a read only memory to store programs for operation upon data entered through said keyboard.

31. The miniaturized portable hand-held cryptographic device of claim 24 wherein said circuitry includes a masked programmed microprocessor to control the operation of said cryptographic device.

32. A cryptographic device comprising:
a housing;
a keyboard on said housing for inputting a plurality of bits of information;
a display on said housing for displaying said list of information input through said keyboard;
circuitry within said housing reponsive to said keyboard inputs for controlling said display;
means in said housing for enciphering said bits of information displayed on said display;
said circuitry operable to remove said displayed keyboard inputs and to display said enciphered bits of information;
means to indicate an error in entry of information; and
said error indication occurs for incorrect number of inputs in a segment in said entry of information.

33. The cryptographic device of claim 32 and further comprising means to recover from said error indication for reentry of new inputs.

34. The cryptographic device of claim 32 wherein said error indication occurs for insufficient number of inputs in a segment in said entry of information.

35. A cryptographic device comprising:
a housing;
a keyboard on said housing for inputting a plurality of bits of information;
a display on said housing for displaying said list of information input through said keyboard;
circuitry within said housing responsive to said keyboard inputs for controlling said display;
means in said housing for enciphering said bits of information displayed on said display;
said circuitry operable to remove said displayed keyboard inputs and to display said enciphered bits of information;
means to indicate an error in entry of information; and
said error indication occurs for incorrect sequence of inputs in said entry of information.

* * * * *